US012633622B2

(12) United States Patent
Kim et al.

(10) Patent No.: US 12,633,622 B2
(45) Date of Patent: May 19, 2026

(54) SEPARATOR FOR SECONDARY BATTERY AND SECONDARY BATTERY COMPRISING SAME

(71) Applicant: SAMSUNG SDI CO., LTD., Yongin-si (KR)

(72) Inventors: Byungsoo Kim, Yongin-si (KR); Yeonho Lee, Yongin-si (KR); Namju Kim, Yongin-si (KR); Jaehyun Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 166 days.

(21) Appl. No.: 18/013,090

(22) PCT Filed: May 16, 2022

(86) PCT No.: PCT/KR2022/006992
§ 371 (c)(1),
(2) Date: Dec. 27, 2022

(87) PCT Pub. No.: WO2022/245083
PCT Pub. Date: Nov. 24, 2022

(65) Prior Publication Data

US 2023/0361427 A1 Nov. 9, 2023

(30) Foreign Application Priority Data

May 17, 2021 (KR) ........................ 10-2021-0063616

(51) Int. Cl.
*H01M 50/449* (2021.01)
*H01M 50/446* (2021.01)
(Continued)

(52) U.S. Cl.
CPC ....... *H01M 50/449* (2021.01); *H01M 50/446* (2021.01); *H01M 50/461* (2021.01); *H01M 50/491* (2021.01)

(58) Field of Classification Search
CPC . H01M 50/446; H01M 50/449; H01M 50/461
See application file for complete search history.

(56) References Cited

U.S. PATENT DOCUMENTS 10,020,481 B2 * 7/2018 Kim .................... H01M 10/058
11,005,141 B2 5/2021 Shin et al.
(Continued)

FOREIGN PATENT DOCUMENTS

CN 106654128 A * 5/2017 .......... H01M 50/446
EP 3226325 A1 * 10/2017 ........ H01M 10/0525
(Continued)

OTHER PUBLICATIONS

Machine translation of JP 2011-246638 (no date) (Year: 0000).*
(Continued)

*Primary Examiner* — Amanda C. Walke
(74) *Attorney, Agent, or Firm* — Lee IP Law, P.C.

(57) ABSTRACT

Provided are a separator for a secondary battery, and a secondary battery including the same, the separator including a porous substrate, an inorganic layer disposed on at least one surface of the porous substrate, and an adhesive layer disposed on the inorganic layer, in which the adhesive layer includes a fluorine-based resin, a polyacrylic acid-based compound, and a nitrogen-containing compound.

16 Claims, 2 Drawing Sheets

(51) Int. Cl.
*H01M 50/46* (2021.01)
*H01M 50/491* (2021.01)

(56) References Cited

U.S. PATENT DOCUMENTS

| | | | | |
|---|---|---|---|---|
| 11,769,929 | B2 * | 9/2023 | Sung | H01M 50/414 429/144 |
| 12,119,514 | B2 * | 10/2024 | Asai | H01M 50/414 |
| 2009/0111025 | A1 | 4/2009 | Lee et al. | |
| 2017/0288192 | A1 * | 10/2017 | Chen | H01M 50/423 |
| 2019/0044118 | A1 | 2/2019 | Sakurai et al. | |
| 2020/0185676 | A1 * | 6/2020 | Lee | H01M 10/052 |
| 2020/0266407 | A1 * | 8/2020 | Honda | H01M 10/0525 |
| 2020/0287192 | A1 | 9/2020 | Shin et al. | |
| 2020/0350546 | A1 | 11/2020 | Sung et al. | |
| 2021/0057703 | A1 | 2/2021 | Hamada et al. | |
| 2021/0234235 | A1 | 7/2021 | Kang et al. | |
| 2022/0200098 | A1 * | 6/2022 | Honda | H01M 10/0525 |
| 2024/0006714 | A1 * | 1/2024 | Kim | H01M 50/461 |
| 2024/0006717 | A1 | 1/2024 | Choi et al. | |

FOREIGN PATENT DOCUMENTS

| | | | | | |
|---|---|---|---|---|---|
| JP | 2011-246638 | A | | 12/2011 | |
| JP | 2017-017041 | A | | 1/2017 | |
| KR | 10-0775310 | B1 | | 11/2007 | |
| KR | 10-2010-0135568 | A | | 12/2010 | |
| KR | 20130092245 | A | * | 8/2013 | C08J 7/04 |
| KR | 10-2016-0121987 | A | | 10/2016 | |
| KR | 10-2017-0113474 | A | | 10/2017 | |
| KR | 10-2017-0123188 | A | | 11/2017 | |
| KR | 20190084894 | A | * | 7/2019 | H01M 2/1686 |
| KR | 10-2011906 | B1 | | 8/2019 | |
| KR | 10-2020-0051370 | A | | 5/2020 | |
| KR | 10-2020-0078010 | A | | 7/2020 | |
| KR | 10-2020-0126820 | A | | 11/2020 | |
| KR | 20200126820 | A | * | 11/2020 | H01M 10/052 |
| KR | 2020-0140637 | A | | 12/2020 | |
| WO | WO-2019082660 | A1 | * | 5/2019 | H01G 11/38 |
| WO | WO-2019130994 | A1 | * | 7/2019 | H01M 50/446 |
| WO | WO-2019135532 | A1 | * | 7/2019 | H01M 10/052 |
| WO | WO-2020091396 | A1 | * | 5/2020 | H01M 50/449 |
| WO | WO-2020263804 | A1 | * | 12/2020 | H01M 50/449 |

OTHER PUBLICATIONS

Machine translation of KR 2020-0126820 (no date) (Year: 0000).*
International Search Report dated Aug. 23, 2022.
European Search Report dated Sep. 25, 2025.
Korean Office action dated Sep. 18, 2025.

* cited by examiner

SEPARATOR FOR SECONDARY BATTERY AND SECONDARY BATTERY COMPRISING SAME

CROSS REFERENCE TO RELATED APPLICATIONS

This is the U.S. national phase application based on PCT Application No. PCT/KR2022/006992, filed May 16, 2022, which is based on Korean Patent Application No. 20-2021-0063616, filed May 17, 2021, the entire contents of all of which are hereby incorporated by reference.

TECHNICAL FIELD

The present invention relates to a separator for a secondary battery and a secondary battery including the same.

BACKGROUND ART

To meet the requirements of miniaturization and high performance of various devices, it is becoming important for lithium batteries to have reduced size and weight. In addition, for lithium batteries to be applied to fields such as electric vehicles, discharge capacity, energy density and cycle characteristics of lithium batteries are becoming crucial factors. To meet the aforementioned usage requirements, lithium batteries having not only high discharge capacity per unit volume, high energy density, and high capacity, but also excellent lifetime characteristics and safety are demanded.

In a lithium battery, a separator is disposed between a positive electrode and a negative electrode in order to prevent a short circuit. An electrode assembly including a positive electrode, a negative electrode, and a separator disposed between the positive electrode and the negative electrode is wound to have the shape of a jelly roll, and the jelly roll is rolled to improve adhesion between the positive electrode/negative electrode and the separator in the electrode assembly.

To manufacture a lithium battery having not only high capacity but also excellent lifetime characteristics and safety, a separator having excellent adhesion and shape stability is required.

DESCRIPTION OF EMBODIMENTS

Technical Problem

An aspect is to provide a separator fora secondary battery having improved adhesion and shape stability.

Another aspect is to provide a secondary battery that includes the above-described separator and thus has excellent capacity, lifetime characteristics, and improved safety.

Solution to Problem

According to one aspect,

Provided is a separator for a secondary battery, the separator including a porous substrate, an inorganic layer disposed on at least one surface of the porous substrate, and an adhesive layer disposed on the inorganic layer, in which the adhesive layer includes a fluorine-based resin, a polyacrylic acid-based compound, and a nitrogen-containing compound.

Another aspect provides a secondary battery including a positive electrode, a negative electrode, and the aforementioned separator therebetween.

Advantageous Effects of Disclosure

A separator for a secondary battery, according to an embodiment, has good heat-resistance and air permeability, maintains excellent adhesion between the separator and electrodes after charging and discharging, and thus prevents deformations in a shape of the battery.

Figure 1:
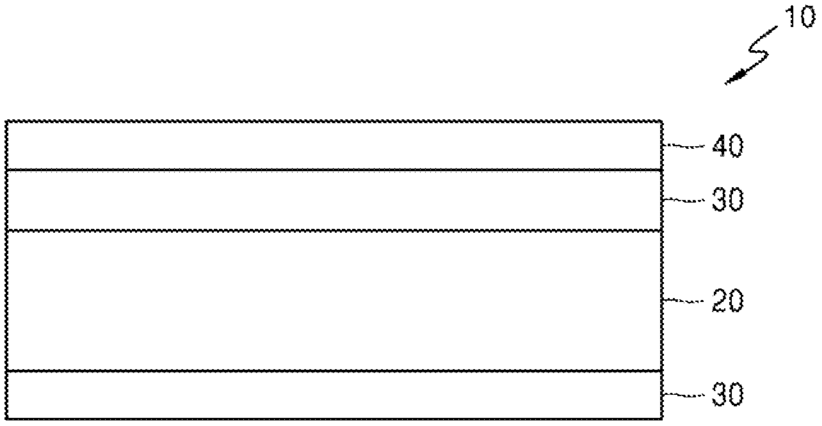
FIG. 1 is a schematic view illustrating a cross-section of a separator of a lithium battery according to an embodiment.

| <Reference numerals> | |
|---|---|
| 10: Separator | 20: Porous substrate |
| 30: Inorganic layer | 40: Adhesive layer |
| 140: Positive electrode | 150: Negative electrode |
| 160: Electrode assembly | 170: Case |

MODE OF DISCLOSURE

Hereinafter, a separator for a secondary battery and a secondary battery including the same according to embodiments will be described in more detail.

In general, a lithium secondary battery has a separator disposed between a positive electrode and a negative electrode, and undergoes a hot press process at a constant temperature and pressure. By the hot press process, adhesions to an interface between the positive electrode and the separator, and adhesion to an interface between the negative electrode and the separator increase to maintain a shape of the battery. When adhesion is insufficient, the interface between the separator and the electrode is lifted off, fundamentally causing a continuous decline in capacity according to cycles of a lithium polymer battery and deterioration of high-rate charging and discharging characteristics. In addition, the insufficient adhesion degrades battery safety, and thus an improvement therefor is demanded.

Accordingly, in order to solve the above-mentioned tasks, the inventors have completed the present invention providing a separator for a secondary battery, the separator including a porous substrate, an inorganic material layer disposed on at least one surface of the porous substrate, and an adhesive layer disposed on the inorganic material, wherein the adhesive layer includes a fluorine-based resin, a polyacrylic acid-based compound, and a nitrogen-containing compound.

The nitrogen-containing compound is, for example, polyalkyleneimine, melamine, aminomethylpentanol, aminobutanamide, cyclohexenimine (7-AZA-Bicyclo[4.1.0]Heptane), benzylamine, methylethylpentylamine, triethyleneamine or a combination thereof. Herein, polyalkyleneimine may be, for example, polyethylene imine and polypropylene imine, etc.

An adhesive layer according to an embodiment may include a (meth)acrylic-based polymer and a nitrogen-containing compound at the same time, therefore has outstanding adhesion to the inorganic material layer, and thus a lithium secondary battery having stable cell performance without abnormal behavior, such as cell expansion during charging and discharging, may be manufactured by more strongly controlling a binding force between the electrode and the separator.

The polyacrylic compound has a weight-average molecular weight of 50,000 to 500,000, for example, 150,000 to 450,000, or 300,000 to 450,000. When the weight-average molecular weight of the (meth)acrylic polymer is within the above ranges, the adhesion of the separator may be improved.

The polyacrylic acid-based compound may be, for example, polyacrylic acid, polymethylacrylic acid, polyethylacrylic acid, polybutylacrylic acid, polyhexylacrylic acid, polyhydroxyethyl methacrylic acid, polyaminoacrylic acid, or a combination thereof.

Hereinafter, a separator for a secondary battery according to an embodiment will be described in detail with reference to FIG. 1.

A secondary battery is, for example, a lithium secondary battery.

Referring to FIG. 1, a separator 10 for a secondary battery according to an embodiment, includes a porous substrate 20 and inorganic material layers 30 disposed on both surfaces of the porous substrate 20. In the separator in FIG. 1, the inorganic material layers 30 are placed on both surfaces of the porous substrate 20, but the inorganic material layer 30 may be disposed on one surface of the porous substrate. An adhesive layer 40 is disposed on the inorganic material layer 30.

The adhesive layer includes a fluorine-based resin, a poly acrylic acid-based compound, and a nitrogen-containing compound.

In the adhesive layer 40, a content of the nitrogen-containing compound is 1 part by weight to 5 parts by weight or 1 part by weight to 3 parts by weight with respect to 100 parts by weight of the total weight of the adhesive layer. When the content of nitrogen-containing compound falls within the above range, the binding force between the electrodes and the separator may be effectively controlled to be stronger.

In the adhesive layer of the separator for a secondary battery, the fluorine-based resin serves as a binder to fix inorganic particles on a porous substrate and to provide good adhesion such that one side of the adhesive layer is well attached to the porous substrate and the other side is well attached to the electrode. The fluorine-based resin, which is a binder, has an average particle diameter of 100 nm to 300 nm. When the fluorine-based resin has an above-mentioned average particle diameter, the adhesive layer has outstanding adhesion to the porous substrate. Even when the separator is exposed to a high temperature, the binder has high heat resistance and thus maintains a matrix form of a network structure.

The fluorine-based resin has a glass transition temperature (Tg) of 50° C. or more, and has a weight-average molecular weight of 200,000 g/mol to 3,000,000 g/mol, 200,000 g/mol to 2,000,000 g/mol, or 300,000 g/mol to 1,200,000 g/mol. In this specification, the weight-average molecular weight may be a polystyrene equivalent molecular weight measured using gel permeation chromatography. When the weight-average molecular weight of the fluorine-based resin falls within the above-mentioned range, the separator may have excellent adhesion.

The fluorine-based resin is, for example, polyvinylidene fluoride, vinylidene fluoride-hexafluoropropylene copolymer, vinylidene fluoride-trichloroethylene copolymer, vinylidene fluoride-chlorotrifluoroethylene copolymer, vinylidene fluoride-hexafluoro a propylene-acrylic acid copolymer or a combination thereof.

The vinylidene fluoride-hexafluoropropylene copolymer may include 90 mol % to 99.5 mol %, 93 mol % to 99 mol %, or 95 mol % to 99 mol % of vinylidene fluoride repeating units. When the amount of the vinylidene fluoride repeating units falls within the above-mentioned range, the vinylidene fluoride-hexafluoropropylene copolymer may secure excellent adhesion and electrolytic solution impregnability.

The fluorine-based resin may have a crystallinity of 35% to 45%, for example, 38% to 45%, or 40% to 45%. The separator having adhesion and including the fluorine-based resin which has such a crystallinity exhibits excellent adhesive strength to a substrate.

A content of the fluorine-based resin according to an embodiment is 92 to 96 parts by weight with respect to the total weight of the adhesive layer. In addition, a content of the polyacrylic acid-based compound is 1 part by weight to 3 parts by weight with respect to the total weight of the adhesive layer.

The separator 10 may include the adhesive layer 30 containing the fluorine-based resin, the polyacrylic acid-based compound, and the nitrogen-containing compound, and thus may exhibit superior heat resistance, stability, and adhesion.

The adhesive layer has a thickness of 0.01 μm to 10 μm, 0.01 μm to 4 μm, or 0.04 μm to 1 μm. When the thickness of the adhesive layer is within the above-mentioned range, the adhesive layer exhibits excellent adhesion. The thickness of the adhesive layer is measured using a film thickness measuring instrument.

The adhesive layer may further include another binder.

According to an embodiment, the adhesive layer may further include a (meth)acrylic binder. The (meth)acrylic binder is a polyacrylate, polymethacrylate, polybutylacrylate, polyacrylonitrile, or a combination thereof. When the adhesive layer further includes a (meth)acrylic binder, a mixed weight ratio of the nitrogen-containing compound and the (meth)acrylic binder may be controlled to be 0.01:1 to 1:1, or 0.25:1 to 0.75:1.

The adhesive layer may further include, for example, at least one selected from the group consisting of polyvinylpyrrolidone, polyvinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methylcellulose, and acrylonitrile-styrene-butadiene copolymer.

The adhesive layer 40 in the separator is applied onto the inorganic layer. An inorganic particle contained in the inorganic layer is not particularly limited, but the inorganic particle typically used in the art may be used. Specific examples of the inorganic particle according to the present disclosure may include at least one among $Al_2O_3$, $SiO_2$, $B_2O_3$, $Ga_2O_3$, $TiO_2$, $SnO_2$, boehmite, $BaSO_4$, MgO, $Mg(OH)_2$, clay, ZnO, CaO, $CeO_2$, NiO, GaO, $ZrO_2$, $Y_2O_3$, $SrTiO_3$, $BaTiO_3$, or the like. The inorganic particle may be used alone, or used as a mixture of at least two thereof. More specifically, $Al_2O_3$(alumina) may be used as the inorganic particle.

A size of the inorganic particle is, for example, 1 μm to 20 μm, 2 μm to 15 μm, or 3 μm to 12 μm. As used herein, the particle "size' indicates an average particle diameter when the particle is spherical and indicates a long-axis length of the particle when the particle is non-spherical. The average diameter indicates volume-based D50. The average particle diameter is measured using, for example, a measuring device through a laser diffraction method or a dynamic light scattering method. The average particle diameter is measured using, for example, a laser scattering particle size distribution analyzer (for example, LA-920 by HORIBA, Ltd), and is a value of the median particle diameter (D50) when the cumulative percentage reaches 50% from the side of small particles in terms of volume.

Using of the inorganic particles having the above-mentioned size may prevent deterioration of dispersibility and coating processability of the inorganic particles in the inorganic layer, and may appropriately adjust the thickness of the inorganic layer, thereby improving mechanical properties. In addition, a size of a pore formed in the separator is appropriately adjusted to lower the possibility of an internal short circuit during charging and discharging of the battery.

In the inorganic layer, the content of the inorganic particles is 50 parts by weight to 95 parts by weight, 60 parts by weight to 95 parts by weight, or 75 parts by weight to 95 parts by weight with respect to 100 parts by weight of the total weight of a dried inorganic layer. When the content of the inorganic particles falls within the above-mentioned range, a thermal contraction of the separator may be effectively suppressed. When the inorganic particles of which the content falls within the above-mentioned range, the heat dissipation characteristics of the inorganic particles may be sufficiently exhibited and thermal contraction of the separator may be effectively suppressed.

The inorganic layer 30 constituting the separator 10 is a heat resistant layer, does not have poor shrinkage and fracture characteristics at a high temperature, and has improved adhesion to the substrate.

The inorganic layer 30 has a thickness of 0.01 μm to 20 μm, 1 μm to 10 μm or 1 μm to 5 μm.

The inorganic layer 30 includes inorganic particles and a crosslinkable binder.

The crosslinkable binder indicates a material capable of generating a binder having cross-linked structure by causing a cross-linking reaction. The crosslinkable binder may be selected from among a monomer having at least one cross-linkable functional group, an oligomer having at least one cross-linkable functional group, and a polymer, having at least one cross-linkable functional group, or mixtures thereof. By curing the crosslinkable binder, physical or chemical bonding between the monomers, the oligomers, or polymers may be formed, and adhesion to the substrate may be improved and the coating density may be increased, due to physical or chemical bonding between the cross-linked binder and the surface-treated inorganic particles, thereby making it possible to thin the separator.

The monomer, oligomer, or polymer, having at least one functional group, includes, for example, at least one functional group selected from the group consisting of an acrylate group, a vinyl group, a hydroxyl group, an epoxy group, an oxane group, an oxetane group, an ester group, and an isocyanate group. The number of functional groups is 2 or more, 3 or more, or 4 or more.

The crosslinkable binder may be, for example, at least one acrylate selected from the group consisting of: alkyl (meth) acrylates, such as methyl methacrylate, methyl acrylate, etc.; bifunctional (meth)acrylates, such as ethylene glycol di(meth)acrylate, propylene glycol di(meth)acrylate, polyethylene glycol di(meth)acrylate, polypropylene glycol di(meth)acrylate, di(meth)acrylate of polyoxyethylene/polyoxypropylene copolymer, butanediol di(meth)acrylate, hexamethylene glycol di(meth)acrylate, etc.; trifunctional (meth)acrylates, such as tri(meth)acrylate of trimethylol propane, tri(meth) acrylate of glycerin, tri(meth)acrylate of ethylene oxide adduct of glycerin, tri(meth)acrylate of propylene oxide adduct of glycerin, ethylene oxide of glycerin, tri(meth) acrylates of propylene oxide adducts, etc.; tetrafunctional or more polyfunctional (meth)acrylates such as diglycerin hexa (meth)acrylate, etc.; polyfunctional urethane acrylate; polyfunctional epoxy acrylate; and polyester acrylate.

The crosslinkable binder may be, for example, vinylpyrrolidone, vinyl caprolactam, vinylimidazole, vinyl-methyl-acetamide, ethyl vinyl ether, propyl vinyl ether, butyl vinyl ether, pentyl vinyl ether, hexyl vinyl ether, heptyl vinyl ether, octyl vinyl ether, nonyl vinyl ether, decyl vinyl ether, cyclohexyl vinyl ether, ethylhexyl vinyl ether, dodecyl vinyl ether, octadecyl vinyl ether and the like.

The crosslinkable binder may be, for example, biphenol, bisphenol A, methanediol, ethanediol, propanediol, butanediol, pentanediol, hexanediol, heptanediol, octanediol, nonanediol, decanediol and the like. Examples of the monomer, oligomer or polymer having at least one epoxy group may include: diepoxyalkanes such as diepoxyethane, diepoxypropane, diepoxybutane, diepoxypentane, diepoxyhexane, diepoxyheptane, diepoxyoctane, diepoxynonane, and diepoxydodecane, and the like; glycidyl ethers such as bisphenol A diglycidyl ether, bisphenol F diglycidyl ether, brominated bisphenol A diglycidyl ether, phenol novolac glycidyl ether, and cresol novolak glycidyl ether, and the like; glycidyl esters such as hexahydrophthalic acid glycidyl ester and dimer acid glycidyl ester, and the like; glycidyl amines such as glycidyl isocyanurate and tetraglycidyl diamino phenylmethane, and the like; linear aliphatic epoxides such as epoxidized polybutadiene, and the like; alicyclic epoxides such as 3,4-epoxy-6-methylcyclohexyl methyl carboxylate and 3,4-epoxycyclohexyl methyl carboxylate and the like.

The crosslinkable binder may be 4,4'-diphenylmethane diisocyanate, toluene diisocyanate, tolylene diisocyanate, naphthylene diisocyanate, 4,4'-dicyclohexylenemethane diisocyanate, cyclohexylene diisocyanate, 3,3'-Dimethylphenylene diisocyanate, diphenylmethane diisocyanate, 3,3'-dimethyl diphenylmethane diisocyanate, 4,6'-xylylene diisocyanate, 4,4'-dicyclohexylmethane diisocyanate, 3,5,5-trimethyl cyclohexylene diisocyanate, 1,6-hexamethylene diisocyanate, 2,2,4-trimethylhexamethylene diisocyanate, m-xylene diisocyanate, trimethyl xylene diisocyanate, p-phenylene diisocyanate, isophorone diisocyanate, 1,5-naphthalene diisocyanate, trans-1,4-cyclohexyl diisocyanate, etc.

In addition, a compound including a structure represented by Formula 1 below may be used as the crosslinkable binder.

<Formula 1>

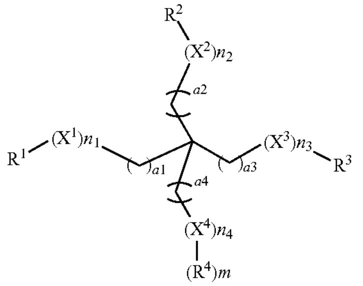

In Formula 1, $X^1$ to $X^3$ are each an oxyethylene group, $X^4$ is an oxyethylene group or an alkyl group having 1 to 10 carbon atoms, $R^1$ to $R^4$ are each independently at least one selected from the group consisting of a (meth)acrylate functional group, a hydroxyl functional group, a carboxyl functional group, an ester functional group, a cyanate functional group, an isocyanate functional group, an amino functional group, a thiol functional group, an alkoxy functional group having 1 to 10 carbon atoms, a vinyl functional group, or a heterocyclic functional group, $a^1$ to $a^4$ are each an integer of 1 to 10, and $n^1$ to $n^3$ are each an integer of 0 to 10, at least one of $n^1$ to $n^4$ is an integer of 1 to 10. When $X^4$ is the oxyethylene group, $n^4$ is an integer of 1 to 10, and m is 1, and when $X^4$ is an alkyl group having 1 to 10 carbon atoms, $n^4$ is 1 and m is 0.

The ester group may be represented by —COOR, the amino group may be represented by $—NR^aR^b$, where R, $R^a$ and $R^b$ are each independently any one selected from the group consisting of an alkyl group having 1 to 20 carbon atoms, an alkenyl group having 2 to 20 carbon atoms, an alkynyl group having 2 to 20 carbon atoms, a cycloalkyl group having 3 to 20 carbon atoms, a cycloalkenyl group having 3 to 20 carbon atoms, a cycloalkynyl group having 4 to 20 carbon atoms, and an aryl group having 6 to 30 carbon atoms. In addition, the heterocyclic group may be one selected from the group consisting of a hetero cycloalkyl group having 2 to 20 carbon atoms, a hetero cycloalkenyl group having 3 to 20 carbon atoms, a hetero cycloalkynyl group having 3 to 20 carbon atoms, and a hetero aryl group having 6 to 20 carbon atoms, and may include a hetero atom selected from among N, O, and S. For example, the heterocyclic group may be an epoxy group, an oxetane group, etc.

A compound of Formula 1 may be, for example, compounds of Formula 2 or 3 below.

<Formula 2>

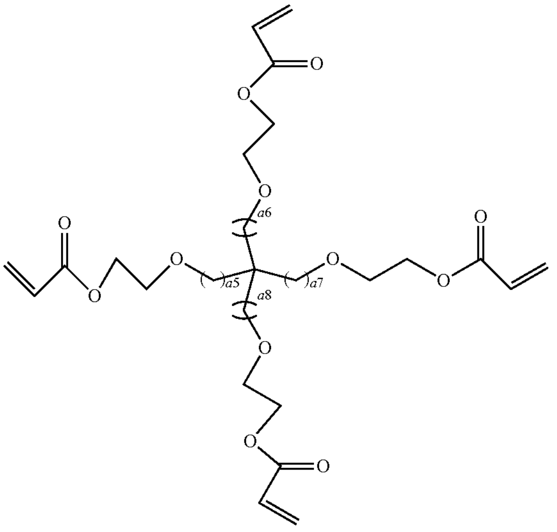

-continued

<Formula 3>

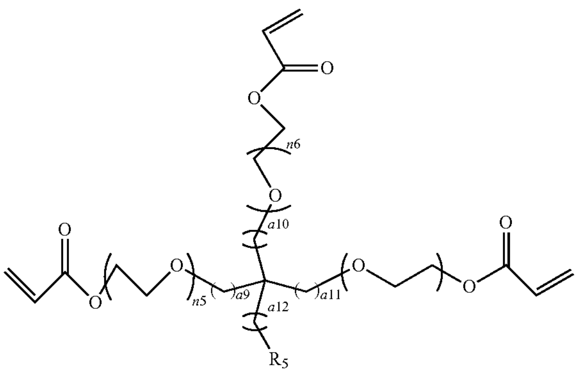

In Formulas 2 and 3, $R^5$ may be an alkyl group having 1 to 10 carbon atoms, $n^5$ to $n^7$ may be each an integer of 1 to 5, and $a^5$ to $a^{12}$ may be each an integer of 1 to 10.

The compound of Formula 1 may include, for example, ethoxylated pentaerythritol tetraacrylate or ethoxylated trimethylolpropane triacrylate.

An amount of the crosslinkable binder is 1 part to 10 parts by weight, or 1 part by weight to 5 parts by weight with respect to 100 parts by weight of the total weight of the inorganic layer. When an amount of the crosslinkable binder is within the above-mentioned range, excellent heat-resistant shrinkage and fracture characteristics are achieved.

The inorganic particles included in the inorganic layer may be surface-treated so as to be capable of reacting with the crosslinkable binder. The inorganic particles may be surface-treated with, for example, a functional group capable of reacting with the functional group of the crosslinkable binder. When the inorganic particles are surface-treated, a crosslinking reaction occurs due to a reaction between the functional groups of the inorganic particles and the crosslinkable binder, and a crosslinking reaction of the functional groups in the inorganic particles occurs together as well. Therefore, binding force between the inorganic particles and the crosslinkable binder may be improved, and adhesion to the substrate or coating density may be improved. For example, when the crosslinkable binder has an acrylate functional group, the inorganic particles may be surface-treated to have an acrylate functional group.

An inorganic layer according to an embodiment may further include a non-crosslinkable binder. The inorganic layer further includes the non-crosslinkable binder, and thus adhesion to the substrate or the electrode and heat-resistance may be further improved.

The non-crosslinkable binder may be, for example, a single material selected from the group consisting of polyvinylidene fluoride (PVdF) polymer, polymethyl methacrylate, polyacrylonitrile, polyvinylpyrrolidone, polyvinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, and acrylonitrile-butadiene-styrene copolymer, or a mixture thereof. As the non-crosslinkable binder, for example, a vinylidene fluoride polymer may be used.

The vinylidene fluoride polymer may be, for example, polyvinylidene fluoride, vinylidene fluoride copolymer, or a mixture thereof. The vinylidene fluoride copolymer indicates a polymer containing at most 5 wt % of a repeating unit other than vinylidene fluoride repeating units. The vinylidene fluoride copolymer may be, for example, a vinylidene fluoride-hexafluoropropylene copolymer.

When the non-crosslinkable binder is included in addition to the crosslinkable binder, a weight ratio of the crosslinkable binder and the non-crosslinkable binder may be 8:2 to 2:8, specifically, 3:7 to 7:3. When the non-crosslinkable binder is used within the above-mentioned range, a separator having improved adhesion and heat-resistance may be prepared.

The porous substrate has a thickness of 1 μm to 100 μm, 1 μm to 40 μm, 1 μm to 30 μm, 5 μm to 20 μm, 5 μm to 5 μm, or 5 μm to 10 μm. When the porous substrate having the above-mentioned thickness range, a separator having an appropriate thickness that is thick enough to prevent a short circuit between the positive electrode and negative electrode of the battery but is not too thick to increase an internal resistance of the battery may be prepared.

The porous substrate included in the separator may have a porosity of 5% to 95%, or 30% to 80%, for example, 40% to 60%, and have an air permeability of 250 sec/100 cc or less, specifically, 200 sec/100 cc or less, more specifically, 150 sec/100 cc or less. Additionally, the porous substrate in the separator may have a pore size of 0.01 μm to 50 μm, 0.01 μm to 20 μm, or 0.01 μm to 10 μm. When the porous substrate included in the separator has the porosity, air permeability, and pore size within the above-mentioned ranges, the porous substrate having excellent mechanical properties may be obtained without an increase in internal resistance of a lithium battery.

The porous substrate may be, without limitation, a polymer film formed of any one polymer selected from the group consisting of polyolefins such as polyethylene and polypropylene, polyesters such as polyethylene terephthalate and polybutylene terephthalate, polyacetals, polyamides, polyimides, polycarbonates, polyether ether ketones, poly aryl ether ketones, polyetherimides, and polyamide-imides, polybenzimidazole, polyethersulfone, polyphenylene oxide, cyclic olefin copolymer, polyphenylene sulfide and polyethylene naphthalate, or a mixture of two or more thereof.

As an example, the porous substrate may be a polyolefin-based substrate, and the polyolefin-based substrate may have an excellent shutdown function to contribute to improving the battery safety. The polyolefin-based substrate may be selected from the group consisting of, for example, a polyethylene single film, a polypropylene single film, a polyethylene/polypropylene double film, a polypropylene/polyethylene/polypropylene triple film, and a polyethylene/polypropylene/polyethylene triple film. As another example, the polyolefin-based resin may include a non-olefin resin in addition to an olefin resin, or may include a copolymer of an olefin monomer and a non-olefin monomer.

A method for preparing a separator according to an embodiment may include any method available in the art. For example, a separator may be prepared by a process of preparing a slurry containing organic particles, a first binder, and optionally inorganic particles, applying the slurry onto a porous substrate, and then drying and rolling the resultant substrate.

A method of applying the slurry is not particularly limited and any method available in the art may be used. For example, a separator may be formed by a method such as printing, compression, press-fitting, roller coating, blade coating, bristling coating, dipping coating, spray coating, streamline coating, or the like.

Before forming the porous adhesive layer on one side or both sides of the separator substrate, pretreatment such as sulfonating treatment, grafting treatment, corona discharge treatment, ultraviolet irradiation treatment, plasma treatment, spatter etching treatment, or the like may be arbitrarily performed in order to improve adhesion with the adhesive layer.

In the separator according to an embodiment, an average transfer rate of a positive electrode active material to the separator, after charging and discharging, according to Equation 1 below may be 30% or more, 40% to 60%, or 45% to 55%.

$$\text{Transfer rate (\%)}=(A_1/A_0)\times 100 \quad \text{[Equation 1]}$$

In Equation 1, $A_0$ is a total area of both surfaces of the separator, and $A_1$ is a sum of areas of the positive electrode active material transferred to the separator when the separator is placed between the positive electrode and the negative electrode, a primary compression is performed at 95° C. to 105° C. for 1 second to 5 seconds with a force of 1 $kgf/cm^2$ to 5 $kgf/cm^2$, then electrolyte is introduced into the compressed positive electrode/separator/negative electrode structure, a secondary compression is performed at 95° C. to 105° C. for 25 seconds to 50 seconds with a force of 10 $kgf/cm^2$ to 200 $kgf/cm^2$, and thereafter charging, discharging and charging are sequentially performed. The area of the positive electrode active material may be measured using an image analyzer known in the art.

The charging, discharging and charging conditions are as follows.

(Charging) 4.35 V, 0.2 C, 50 mA cut-off, 5 hours (discharging) 0.2 V, 3 V cut-off, 5 hours (charging) 0.5 C, 4 V cut-off, 2 hours Since the transfer rate of the positive electrode active material to the separator is 30% or more, changes in battery shape due to a decrease in electrode adhesion in an environment in which the battery expands and contracts repeatedly, according to repeated charging and discharging may be minimized, thereby making it possible to minimize an increase an internal resistance or resulting degradation in battery performance caused by uneven inter-electrode distance. The transfer rate is specifically 40% or more, or 45% or more, for example, 45% to 55%.

In a separator for a secondary battery according to an embodiment, adhesion to the porous substrate may be 0.5 N/mm to 0.7 N/mm, or 0.8 N/mm or more, specifically, 0.8 N/mm to 0.99 N/mm, for example, 0.81 N/mm to 0.93 N/mm. When the adhesion to the substrate falls within the above-mentioned range, adhesion between the adhesive layer and the porous substrate may be enhanced and thus the performance of the battery may be maintained for a long period of time. A method for measuring the adhesion to the substrate is not limited in particular, and any method typically used in the art related to the present disclosure may be used.

A non-limiting example of a method for measuring the adhesion of the separator to the substrate is as follows: according to Korean Industrial Standard KS-A-01107 (Test Method for Adhesive Tape and Adhesive Sheet), the separator is cut to have a width of 25 mm and a length of 250 mm. A tape (nitto 31B) is attached to each side to make a specimen, and then the specimen is compressed by reciprocating once at a speed of 300 mm/min using a compression roller with a load of 2 kg. 30 minutes after the compression, the specimen is rotated by 180°, removed by about 25 mm, and then the separator and the tape attached to one side of the separator is placed and fixed on an upper clip of a tensile strength tester (Instron Series 1X/s Automated materials Tester-3343, by Instron®). The adhesion to the substrate is calculated by fixing the tape attached to the other side of the separator to a lower clip, then pulling the tape at a tensile speed of 60 mm/min, and measuring a pressure at the time when the porous adhesive layer was peeled off from the porous substrate.

The separator may have an adhesion to the positive electrode of 0.5 gf/5 mm or more, and an adhesion to the negative electrode of 0.1 gf/5 mm or more. Specifically, the adhesion to the positive electrode may be 0.8 gf/5 mm or more, and the adhesion to the negative electrode may be 0.2 gf/5 mm or more. In an environment in which expansion and contraction of the battery are repeated as according to repeated charging and discharging of the battery including the separator sufficiently adhered to the positive electrode and the negative electrode within the above-mentioned range, a change in the shape of the battery may be minimized, a short ion transfer distance may be ensured, thereby improving an output efficiency of the battery.

According to further another embodiment of the present disclosure, a secondary battery is provided, which includes a positive electrode, a negative electrode, a separator according to an embodiment disposed between the positive electrode and the negative electrode, and an electrolyte.

The secondary battery may be, for example, a lithium secondary battery, such as a lithium metal secondary battery, a lithium ion secondary battery, a lithium polymer secondary battery, a lithium ion polymer secondary battery, etc.

A method for manufacturing a secondary battery according to the present disclosure is not limited particularly, but a method used typically in the art related to the present disclosure may be used.

Hereinafter, a method for manufacturing a separator according to an embodiment will be described.

An inorganic layer is provided on a porous substrate. When the inorganic layer is formed, a coating method, lamination, coextrusion, or the like may be used. A non-limiting example of the coating method includes roll coating, spin coating, dip coating, flow coating, spray coating, or the like, but is not necessarily limited thereto.

The inorganic layer may be obtained by providing an inorganic layer-forming composition on the porous substrate, and curing the composition through application of light or heat. Photocuring may be particularly ultraviolet curing or far infrared curing, and may be, for example, ultraviolet curing. Photocuring may include irradiating the porous heat resistant layer with an amount of light, for example, in a range of 500 $mJ/cm^2$ to 3000 $mJ/cm^2$, or 500 $mJ/cm^2$ to 2000 $mJ/cm^2$. An irradiation time may be 1 minute to 15 hours. A homogeneous cured density may be obtained by performing a subsequent heat treatment after the photocuring. This heat treatment may be performed for 1 hour to 10 hours at a temperature of about 50° C. to about 180° C. Furthermore, thermal curing may include curing at temperatures of about 40° C. to about 120° C., about 50° C. to about 100° C., or about 60° C. to about 90° C. for 1 hour to 36 hours, specifically, curing for about 5 hours to about 24 hours.

The inorganic layer-forming composition may include a crosslinkable binder-forming material and/or a polymerization initiator for crosslinking the crosslinkable binder and the surface-treated inorganic particles.

The polymerization initiator serves as a curing agent that generates free radicals with heat or light, and may be appropriately selected according to types of functional groups of the material for generating the crosslinkable binder and types of functional groups of the inorganic particles. For example, the initiator may include a thermal polymerization initiator such as a peroxide initiator, an azo initiator, an amine initiator, an imidazole initiator, an isocyanate initiator or the like, or a photopolymerization initiator such as an onium salt or an organometallic salt.

A secondary battery according to another embodiment includes a positive electrode, a negative electrode, and the above-described separator disposed between the positive electrode and the negative electrode. The secondary battery is, for example, a lithium secondary battery.

According to an embodiment, the secondary battery may include an electrode assembly including a positive electrode, a negative electrode, and the above-described separator disposed between the positive electrode and the negative electrode, and the electrode assembly may have a form wound in a jelly roll shape. As the lithium battery includes the above-mentioned separator, the adhesion between electrodes (a positive electrode and a negative electrode) and the separator may increase and thus a change in volume during charging and discharging of the lithium battery may be suppressed. Accordingly, deterioration of the lithium battery accompanying the change in volume of the lithium secondary battery may be suppressed, and thus the lithium battery may have improved lifetime characteristics.

The lithium secondary battery may be manufactured by, for example, a following method.

First, a negative electrode active material composition is prepared, in which a negative electrode active material, a conductive material, a binder, and a solvent are mixed. A negative electrode plate is prepared by directly applying the negative electrode active material composition onto a metal current collector. Alternatively, a negative electrode plate is prepared by casting the negative electrode active material composition may be onto a separate support and then laminating the film, peeled off from the support, on the metal current collector. The negative electrode is not limited to the above-described form, but may have a form other than the above-described form.

The negative electrode active material includes a carbonaceous material.

The carbonaceous material may be crystalline carbon, amorphous carbon, or a mixture thereof. The crystalline carbon may be natural graphite or artificial graphite, which is non-shaped, plate-like, or flake-like, graphene, carbon black, fullerene soot, or a combination thereof.

Natural graphite, which is naturally produced graphite, includes flake graphite, high crystalline graphite, microcrystalline graphite, cryptocrystalline graphite, amorphous graphite, etc. Artificial graphite, which is artificially synthesized graphite, is made by heating amorphous carbon at high temperatures, and includes primary graphite or electrographite, secondary graphite, graphite fiber, etc. Expanded graphite is produced by intercalating chemicals such as acids or alkalis in between graphite layers and being heated to thereby inflate a vertical layer of a molecular structure. Graphene includes a single layer or a plurality of single layers of graphite. Carbon black is a crystalline material having a less regularity than graphite, and when carbon black is heated at about 3000° C. for a long time, the carbon black may be converted into graphite. Fullerene soot is a carbon mixture containing at least 3 wt % of fullerenes, which is a polyhedral bundle-shaped compound composed of 60 or more carbon atoms. The crystalline carbon may have a spherical, plate-like, fibrous, tubular or powdery form.

The amorphous carbon may be soft carbon (carbon calcined at a low-temperature) or hard carbon, mesophase pitch carbide, calcined coke, polymer carbide, or a combination thereof.

The negative active material may further include a non-carbonaceous material. For example, the negative electrode active material may include at least one selected from the group consisting of a metal capable of forming an alloy with lithium, an alloy of a metal capable of forming an alloy with lithium, and an oxide of a metal capable of forming an alloy with lithium.

For example, the metal alloyable with lithium may be Si, Sn, Al, Ge, Pb, Bi, Sb, Si—Y alloy (where Y is an alkali metal, an alkaline earth metal, groups 13 to 16 element, a transition metal, a rare earth element, or a combination thereof, but excludes Si), Sn—Y alloy (where Y is an alkali metal, an alkaline earth metal, groups 13 to 16 element, a transition metal, a rare earth element, or a combination thereof, but excludes Sn), or the like. An element Y may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, lithium vanadium oxide, etc.

For example, the non-transition metal oxide may be $SnO_2$, $SiO_x$ ($0<x<2$), etc.

Specifically, the negative electrode active material may be at least one selected from the group consisting of Si, Sn, Pb, Ge, Al, $SiO_x$ ($0<x\leq2$), $SnO_y$ ($0<y\leq2$), $Li_4Ti_5O_{12}$, $TiO_2$, $LiTiO_3$, and $Li_2Ti_3O_7$. However, an embodiment is not necessarily limited thereto, and any non-carbonaceous negative electrode active material available in the art may be used.

According to an embodiment, as the negative electrode active material, a mixture of the above-mentioned carbonaceous material and a non-carbonaceous material or a composite containing the above-mentioned carbonaceous material and the non-carbonaceous material may be used. Acetylene black, ketjen black, natural graphite, artificial graphite, carbon black, carbon fiber, metal powder such as copper, nickel, aluminum, silver, metal fiber, and the like may be used as the conductive material. In addition, a mixture of one or more of conductive materials such as polyphenylene derivatives, and the like may be used, but an embodiment is not limited thereto, and any material available as a conductive material in the art may be used. In addition, the above-mentioned crystalline carbonaceous material may be additionally used as the conductive material.

As the binder, vinylidene fluoride/hexafluoropropylene copolymer, polyvinylidene fluoride (PVDF), polyacrylonitrile, polymethyl methacrylate, polytetrafluoroethylene, styrene butadiene rubber-based polymer, or a combination thereof may be used. However, an embodiment is not limited thereto, and any material available as the binder in the art may be used.

As the solvent, N-methyl pyrrolidone, acetone, or water may be used. However, an embodiment is not limited thereto, and any material available in the art may be used.

Amounts of the negative active material, the conductive material, the binder, and the solvent are at the typical usage levels of lithium batteries. According to the application and configuration of the lithium batteries, at least one among the conductive material, the binder and the solvent may be omitted.

Meanwhile, the binder used in manufacturing the negative electrode may be the same as a coating composition included in the adhesive layer of the separator.

Next, a positive electrode active material composition is prepared, in which the positive electrode material, the conductive material, the binder, and the solvent are mixed. A positive electrode plate is prepared by directly applying the positive electrode active material composition onto a metal current collector and drying the composition. Alternatively, the positive electrode plate may be prepared by casting the positive electrode active material composition onto a separate support, and then laminating the film peeled off from the support on a metal current collector.

The positive active material may include at least one selected from the group consisting of lithium cobalt oxide, lithium nickel cobalt manganese oxide, lithium iron phosphate, and lithium manganese oxide. However, an embodiment is not necessarily limited thereto, and any positive active material available in the art may be used.

For example, a compound may be used which is represented by any of chemical formulas of: $Li_aA_{1-b}B_bD_2$ (where, $0.90\leq a\leq1.8$, and $0\leq b\leq0.5$ are satisfied.); $Li_aE_{1-b}B_bO_{2-c}D_c$ (where, $0.90\leq a\leq1.8$, $0\leq b\leq0.5$, and $0\leq c\leq0.05$ are satisfied.); $LiE_{2-b}B_bO_{4-c}D_c$ (where, $0\leq b\leq0.5$, and $0\leq c\leq0.05$ are satisfied.); $Li_aNi_{1-b-c}Co_bB_cD_\alpha$ (where, $0.90\leq a\leq1.8$, $0\leq b\leq0.5$, $0\leq c\leq0.05$, and $0<\alpha\leq2$ are satisfied.); $Li_aNi_{1-b-c}Co_bB_cO_{2-\alpha}F_\alpha$ (where, $0.90\leq a\leq1.8$, $0\leq b\leq0.5$, $0\leq c\leq0.05$, and $0<\alpha<2$ are satisfied); $Li_aNi_{1-b-c}Co_bB_cO_{2-\alpha}F_2$ (where, $0.90\leq a\leq1.8$, $0\leq b\leq0.5$, $0\leq c\leq0.05$, and $0<\alpha<2$ are satisfied.); $Li_aNi_{1-b-c}Mn_bB_cD_\alpha$ (where, $0.90\leq a\leq1.8$, $0\leq b\leq0.5$, $0\leq c\leq0.05$, and $0<\alpha\leq2$ are satisfied.); $Li_aNi_{1-b-c}Mn_bB_cO_{2-\alpha}F_\alpha$ (where, $0.90\leq a\leq1.8$, $0\leq b\leq0.5$, $0\leq c\leq0.05$, and $0<\alpha<2$ are satisfied.); $Li_aNi_{1-b-c}Mn_bB_cO_{2-\alpha}F_2$ (where, $0.90\leq a\leq1.8$, $0\leq b\leq0.5$, $0\leq c\leq0.05$, and $0<\alpha<2$ are satisfied.); and $Li_aNi_bE_cG_dO_2$ (where, $0.90\leq a\leq1.8$, $0\leq b\leq0.9$, $0\leq c\leq0.5$, $0.001\leq d\leq0.1$ are satisfied.); $Li_aNi_bCo_cMn_dGeO_2$ (where, $0.90\leq a\leq1.8$, $0\leq b\leq0.9$, $0\leq c\leq0.5$, $0\leq d\leq0.5$, and $0.001\leq e\leq0.1$ are satisfied); $Li_aNiG_bO_2$ (where, $0.90\leq a\leq1.8$ and $0.001\leq b\leq0.1$ are satisfied); $Li_aCoG_bO_2$ (where, $0.90\leq a\leq1.8$ and $0.001\leq b\leq0.1$ are satisfied); $Li_aMnG_bO_2$ (where, $0.90\leq a\leq1.8$ and $0.001\leq b\leq0.1$ are satisfied); $Li_aMn_2G_bO_4$ (where, $0.90\leq a\leq1.8$ and $0.001\leq b\leq0.1$ are satisfied); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0\leq f\leq2$); $Li_{(3-f)}Fe_2(PO_4)_3$ ($0\leq f\leq2$); $LiFePO_4$.

In Formulas above, A is Ni, Co, Mn, or a combination thereof; B1 is Al, Ni, Co, Mn, Cr, Fe, Mg, Sr, V, a rare earth element, or a combination thereof; D1 is O, F, S, P, or a combination thereof; E is Co, Mn, or a combination thereof; F1 is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

Also, a compound having a coating layer on the surface thereof may be used, or a mixture of the compound and the compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. A compound constituting the coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In a process of forming the coating layer, any coating method may be used as long as this compound is coated with such elements through a method that does not have an adverse effect on the physical properties of the positive electrode active material (for example, spray coating, dipping, etc.). These methods are well known to those skilled in the art, and so a detailed description thereof will be omitted.

For example, $LiNiO_2$, $LiCoO_2$, $LiMn_xO_{2x}$(x=1, 2), $LiNi_{1-x}Mn_xO_2$(0<x<1), $LiNi_{1-x-y}Co_xMn_yO_2$ (0≤x≤0.5, 0≤y≤0.5), $LiFeO_2$, $V_2O_5$, TiS, MoS, and the like may be used.

In the positive electrode active material composition, the conductive material, the binder, and the solvent may be the same as those in the negative electrode active material composition. Meanwhile, by further adding a plasticizer to the positive electrode active material composition and/or the negative electrode active material composition, pores may be formed inside the electrode plates.

Amounts of the positive electrode active material, the conductive material, the general binder, and the solvent are at the typical usage levels of in lithium batteries. At least one among the conductive material, the typical binder, or the solvent may be omitted according to the application and configuration of the lithium battery.

Meanwhile, the binder used in manufacturing the positive electrode may be the same as the adhesive layer composition included in the adhesive layer of the separator.

Next, the above-mentioned separator is disposed between the positive electrode and the negative electrode.

In the electrode assembly including a positive electrode/a separator/a negative electrode, the separator disposed between the positive electrode and the negative electrode includes, as described above, a fully porous substrate; and adhesive layers disposed on both surfaces of the porous substrate, and the adhesive layers include a coating composition for the above-mentioned separator.

The separator may be separately prepared and disposed between the positive electrode and the negative electrode. Alternatively, the separator is prepared by: winding an electrode assembly including a positive electrode/separator/negative electrode into a jelly roll shape; then accommodating the jelly roll in a battery case or a pouch; pre-charging while thermally softening under pressure in a state in which the jelly roll was accommodated in the battery case or the pouch; and subjecting the charged jelly roll to a formation step in which the charged jelly roll is hot-rolled, cold-rolled, and charged and discharged under pressure.

Next, an electrolyte is prepared.

The electrolyte may be in a liquid or gel state.

For example, the electrolyte may be an organic electrolyte solution. In addition, the electrolyte may be solid. For example, the electrolyte may be boron oxide, lithium oxynitride, etc. However, an embodiment is not limited thereto, any material available as a solid electrolyte in the art may be used. The solid electrolyte may be formed on the negative electrode through a method such as sputtering, etc.

For example, the organic electrolyte solution may be prepared. The organic electrolyte solution may be prepared by dissolving a lithium salt in an organic solvent.

Any organic solvent available in the art as an organic solvent may be used as the organic solvent. For example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, methyl propionate, ethyl propionate, propyl propionate, benzonitrile, acetonitrile, tetrahydrofuran, 2-methyl tetrahydrofuran, γ-butyrolactone, dioxolane, 4-methyl dioxolane, N, N-dimethylformamide, dimethylacetamide, dimethyl sulfoxide, dioxane, 1,2-dimethoxy ethane, sulfolane, dichloroethane, chlorobenzene, nitrobenzene, diethylene glycol, dimethyl ether, mixtures thereof, or the like may be used.

Any material available in the art as a lithium salt may be used as the lithium salt. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(CyF_2F_{2y+1}SO_2)$ (where x,y are natural numbers), LiCl, LiI, mixtures thereof, or the like.

Figure 2:
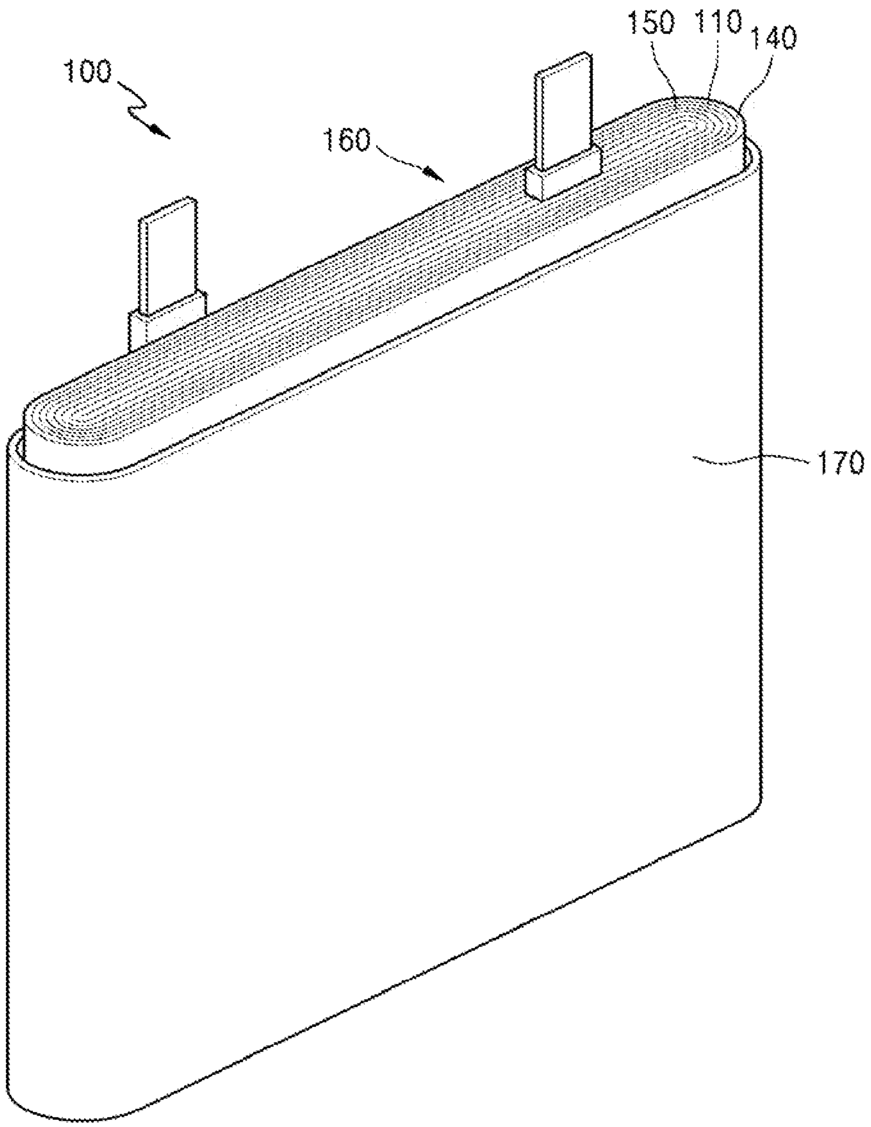
FIG. 2 is a schematic view of a lithium battery according to an embodiment.

According to an embodiment, a lithium secondary battery having a rectangular shape will be described. FIG. 2 is an exploded perspective view of a lithium battery according to an embodiment.

Referring to FIG. 2, a lithium secondary battery 100 according to an embodiment includes an electrode assembly 160 which includes a separator 110 disposed between a positive electrode 140 and a negative electrode 150 and is wound, and a case 170 in which the electrode assembly 160 is accommodated.

The electrode assembly 160 may have, for example, a jelly roll shape formed by winding the positive electrode 140 and the negative electrode 150 with separator 110 disposed therebetween.

The positive electrode 140, the negative electrode 150, and the separator 110 is impregnated in an electrolyte solution (not shown).

The lithium secondary battery may be a lithium-ion battery. The lithium battery may be a lithium polymer battery.

Since the lithium secondary battery has excellent high-rate characteristics and lifetime characteristics, the lithium secondary battery is suitable for electric vehicles (EVs). For example, the lithium secondary battery is suitable for hybrid vehicles, for example, plug-in hybrid electric vehicles (PHEVs).

The present disclosure will be described in more detail through Examples and Comparative Examples hereafter. However, Examples are provided to illustrate the present disclosure, and the scope of the present disclosure is not limited thereto.

Preparation of Separator

Example 1

Multifunctional urethane acrylic polymers (SC2152, made by Miwon Specialty Chemical Co., Ltd) having a weight-average molecular weight (Mw) of about 20,000 were dissolved in acetone so that the amount thereof becomes 30 wt %, and the resultant mixture was stirred for 1 hour at 25° C. using a stirrer to prepare a first polymer solution. In addition, 30 wt % of dipentaerythritol hexaacrylate binders (DPHA, from Sanopco Co., Ltd) having a weight-average molecular weight (Mw) of 600 were stirred for 1 hour at 25° C. to thereby prepare a second polymer solution.

Separately, after pulverizing alumina ($Al_2O_3$, made by Nippon Light Metal Co., Ltd, Japan)) through a beadmill, 25 wt % of the pulverized alumina and 75 wt % of acetone were mixed at 40° C. for 4 hours to thereby obtain an inorganic dispersion.

The first polymer solution and the second polymer solution were mixed such that a weight ratio of a first polymer to a second polymer was 7:3 and an alumina content was 95 parts by weight with respect to 100 parts by weight of the total weight of the inorganic layer, and the resultant mixture was stirred using a power mixer at 25° C. for 2 hours to thereby prepare an inorganic layer-forming composition.

The prepared inorganic layer-forming composition was applied on a cross-section of polyethylene monolayer base film having a thickness of 9 μm through a gravure coating method, and then dried for 10 seconds under conditions of a drying temperature of 60° C. and a wind speed of 15 m/sec, and thermally cured at a temperature of 80° C. for 10 hours to thereby prepare a separator including an inorganic layer having a coating thickness of 2 μm on one surface of the polyethylene monolayer base film.

le;3qSeparately, polyvinylidene fluoride-hexafluoropropylene copolymers (PVdF-HFPs) (RC-10278, made by Arkema Co., Ltd., weight-average molecular weight 45,0000 g/mol) were mixed in water such that the amount of the PVdF-HFPs became 8 wt %, then the resultant mixture was stirred using a stirrer (R010, by IK co. Ltd) at 25° C. for 30 minutes to prepare a solution including PVdF-HFP particulates having an average particle diameter of 100 nm. Polyacrylic acid (PAA) (AQC, manufactured by Sumitomo) and a nitrogen-containing compound (JET-1971, made by BYK) were added to the resultant solution at a ratio listed in Table 1 to thereby prepare an adhesive layer-forming composition.

The adhesive layer-forming composition was applied on the inorganic layer of the separator using a gravure coating method, then dried under conditions of a drying temperature of 70° C. and a wind speed of 15 m/s for 10 seconds, and then an adhesive layer of 0.7 g/m$^2$ (cross-section) was formed to a thickness of 1.0 μm to thereby prepare a separator.

Examples 2-4

A separator was prepared in the same manner as Example 1 except that an acrylic binder (930B, made by Zeon Co., Ltd.) was added in preparation of the adhesive layer-forming composition, a content of the acrylic binder was changed as shown in following Table 1, and the compositional ratio of the adhesive layer-forming composition was varied as listed in Table 1.

Examples 5, Comparative Examples 1-4

A separator was prepared using the same method as in Example 1 except that the compositional ratio of an adhesive layer-forming composition was varied as listed in following Table 1.

TABLE 1

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Adhesive layer composition | PVdF-HFP | 96 | 92 | 92 | 92 | 92 | 92 | 92 | 92 | 92 |
| | Acrylic binder | — | 4 | 4 | 4 | 4 | — | — | — | 4 |
| | PAA | 2 | 2 | 1 | 3 | 2 | — | 8 | — | — |
| | PVA | — | — | — | — | | 8 | — | 8 | — |
| | Amine compound | 2 | 2 | 3 | 1 | 2 | — | — | 8 | — |

In Table 1, 930B (made by Zeon co, Ltd) was used as the acrylic binder, KL-520 (made by KURARAY Co., Ltd) was used as the polyvinyl alcohol, PVP (made by Ashland) was used as the polyvinylpyrrolidone, AES11 (made by Sumitomo Co., Ltd) was used as the alumina, and AQC (a weight-average molecular weight of 450,000, made by Sumitomo) was used as the PAA. Additionally, as the nitrogen-containing compound usable as a binder, a pyrrole compound (JET-1971, made by BYK) was used, and DisperBYK-2055 (with a weight-average molecular weight of 10,000) was used.

Manufacturing of Lithium Secondary Battery

Manufacturing Example 1

Manufacturing of Negative Electrode

A negative electrode was manufactured according to the following process.

97 wt % of graphite particles having an average particle diameter of 25 μm, 1.5 wt % of a styrene-butadiene rubber (SBR) binder, 1.5 wt % of carboxymethylcellulose (CMC) were mixed, and the mixture was then added to distilled water and was stirred for 60 minutes using a mechanical stirrer to thereby prepare a negative electrode active material slurry. The slurry was applied on a copper current collect having a thickness of 10 μm using a doctor blade, dried for 0.5 hours in a hot air dryer at 100° C., then dried again for 4 hours under conditions of a vacuum and 120° C., and was roll-pressed to thereby prepare a negative electrode.

Manufacturing of Positive Electrode

Separately, a positive electrode was manufactured according to the following process.

97 wt % of $LiCoO_2$, 1.5 wt % of carbon black power as a conductive material, and 1.5 wt % of polyvinylidene fluoride (PVdF) were mixed, the mixture was added to a N-methyl-2-pyrrolidone solvent, and the resultant mixture was stirred for 30 minutes using a mechanical stirrer to thereby prepare a positive electrode active material slurry. The slurry was applied on an aluminum current collector having a thickness of 20 μm using a doctor blade, dried for 0.5 hours in a hot air dryer at 100° C., then dried again for 4 hours under conditions of vacuum and 120° C., and was roll-pressed to thereby prepare a positive electrode.

(Jelly Roll of Electrode Assembly)

The separator prepared according to Example 1 was disposed between the positive electrode and the negative electrode prepared as above and the resultant was wound to thereby prepare an electrode assembly jelly roll. The jelly roll was inserted into a pouch, an electrolyte solution was injected, and then the pouch was vacuum sealed.

A solution, in which 1.3 M of $LiPF_6$ was dissolved in a mixed solvent in which ethylene carbonate (EC), ethyl methyl carbonate (EMC), and diethyl carbonate (DEC) were mixed at a volume ratio of 3:5:2, was used as the electrolyte solution.

A lithium battery was manufactured by performing a press at a temperature of 80° C. for 3 minutes while applying a pressure of 11.7 kgf/$cm^2$ to the jelly roll inserted into the pouch.

Manufacturing Example 2-5

A lithium battery was manufactured in the same manner as Manufacturing Example 1, except for the separator according to Examples 2-5 were used instead of the separator according to Example 1.

Comparative Manufacturing Example 1-4

A lithium battery was manufactured in the same manner as Example 1, except that separators according to Comparative Examples 1 to 4 were used instead of the separator according to Example 1.

Evaluation Example 1: Evaluation of Adhesion

For the lithium batteries according to Manufacturing Examples 1 to 5, and Comparative Manufacturing Examples 1 to 4, wet adhesion was measured and listed in following Table 2.

The wet adhesion was evaluated for each lithium battery by measuring the adhesion (bending strength) between an active material layer of the positive electrode and a separator, as measured using a 3-point bending method. The pouch cell, which had undergone 0.1 C charging and discharging, was pressed at a speed of 5 mm/min using a jig, and the MAX value (N, MPa) from a zero-point to the time of 5 mm bending was measured. Evaluation conditions of the 3-point bending (INSTRON) method are as follows.

Lower Span Width: 27 mm, Lower Span Diameter: 5 mm

Upper Jig Diameter: 5 mm, Load Cell: 1000 N

Referring to Table 2, the wet adhesion (bending strength) of the separators in the lithium batteries according to Examples 1 to 5 was found to be better than those of the separators in Comparative Examples 1 to 4.

Evaluation Example 2: Lifetime Characteristics

Charging and discharging characteristics of the lithium secondary battery manufactured according to Manufacturing Examples 1 to 5 and Comparative Manufacturing Examples 1 to 4 were evaluated using a charge/discharge apparatus (TOYO-3100, made by TOYO SYSTEM Co., Ltd).

During a first charge/discharge cycle, a constant current charging was executed at a current rate of 0.1 C until the voltage reached 4.4 V, followed by a constant voltage charging until the current reached a current of 0.05 C. Once the charging was completed, the cell rested for about 10 minutes, and then was subjected to constant current discharge at a current rate of 0.1 C until the voltage reached 3 V. In a second charge/discharge cycle, a constant current charging was executed at a current rate of 0.2 C until the voltage reached 4.2 V, and followed by a constant voltage charging was executed until the current reached a current of 0.05 C. Once the charging was completed, the cell rested for about 10 minutes, and then was subjected to constant current discharge at a current rate of 0.2 C until the voltage reached 3 V.

For lifetime evaluation, after constant current charging is executed until the voltage reached 4.4 V at a current rate of 1 C, constant voltage charging was executed until a current rate reached a current of 0.05 C. Once the charging was completed, the cell rested for about 10 minutes. Thereafter, constant current discharge cycles at a current rate of 1 C until the voltage reached 3 V was executed repeatedly 500 times and then the lifetime characteristics of the charged cell was evaluated.

Results of the lifetime evaluation were listed in following Table 2.

The lifetime was evaluated according to following Equation 1.

Lifetime=(discharge capacity for 500 cycles/discharge capacity for 1 cycle)×100 <Equation 1>

Evaluation Example 3: Transfer Rate of Electrode Active Material after Charging and Discharging LCO ($LiCoO_2$), as a positive electrode active material, was applied with a thickness of 94 μm on an aluminum foil having a thickness of 20 μm, dried and rolled to prepare a positive electrode having a total thickness of 114 μm. Natural graphite and artificial graphite (1:1), as a negative electrode active material, were applied with a thickness of 120 μm on a copper foil having a thickness of 10 μm, dried and rolled to prepare a negative electrode having a thickness of 130 μm. 1.3M $LiPF_6$ mixed in an organic EC/EM/DEC solvent at a volume ratio of 3:5:2 was used as an electrolyte solution.

The separator (area of both sides: $A_0$) prepared according to each of the above-described Examples 1 to 5 and Comparative Examples 1 to 4 was disposed between the positive electrode and the negative electrode and wound into a jelly roll-shaped electrode assembly. The electrode assembly was subjected to a first compression at 100° C. for 3 seconds under a pressure of 3 kgf/$cm^2$, subsequently put into an aluminum-coated pouch, and two neighboring corners of the aluminum-coated pouch were sealed at a temperature of 143° C. Thereafter, 6.5 g of the electrolyte solution was added, and the aluminum-coated pouch was sealed for 3 minutes or more to eliminate any residual air in the battery using a degassing machine. The prepared battery was aged at 25° C. for 12 hours, and subjected to a second compression at 100° C. for 30 seconds under a pressure of 30 kgf/$cm^2$. After the device was pre-charged for 1 hour at a voltage of 4.35 V and a current rate of 0.2 C, the gas inside the battery was eliminated, then the device was subjected to charge/discharge cycles under the following charging, and discharging and charging conditions. Then, the battery was disassembled, the area of the positive electrode active material that had been transferred to the separator was measured using an image analyzer (product name: Easy Measure converter 1.0.0.4) and the transferred area ($A_1$) was calculated by summing the measured values.

(Charging) 4.35 V, 0.2 C, 50 mA cut-off, 5 hours, (discharging) 0.2 V, 3 V cut-off, 5 hours (charging) 0.5 C, 4 V cut-off, 2 hours The transfer rate (%) of the positive electrode active material to the separator was determined by calculating a ratio of the transferred area $A_1$ to the total area $A_0$ of the separator and multiplying the ratio by 100.

Evaluation Example 4: Binding Force to a Porous Substrate (Hereinafter, Referred to as Substrate Binding Force)

The test was carried out according to Korean Industrial Standard KS-A-01107 (Test method for adhesive tape and adhesive sheet). The prepared separators according to Examples and Comparative Examples were each cut to have a width of 25 mm and a length of 250 mm. A tape (nitto 31B) was attached to both sides to make a specimen, and then the specimen was compressed by reciprocating once at a speed of 300 mm/min using a compression roller with a load of 2 kg. 30 minutes after the compression, the specimen was inverted by 180°, removed by about 25 mm, and then the separator and the tape attached to one side of the separator were placed and fixed on an upper clip of a tensile strength tester (Instron Series 1X/s Automated materials Tester-3343, from Instron®). The tape attached to the other side of the separator was fixed to a lower clip and then was pulled at a tensile speed of 60 mm/min to measure a pressure at the time when the porous adhesive layer was peeled off from the porous substrate.

The invention claimed is:

1. A separator for a secondary battery, the separator comprising:

a porous substrate, an inorganic layer on at least one surface of the porous substrate, and an adhesive layer on the inorganic layer, wherein the adhesive layer includes a fluorine resin, a polyacrylic acid compound, and a nitrogen-containing compound, wherein the fluorine resin has a weight-average molecular weight of 200,000 g/mol to 3,000,000 g/mol, and wherein the nitrogen-containing compound includes aminomethylpentanol, aminobutanamide, cyclohexenimine, benzylamine, methylethylpentylamine, triethyleneamine, or a combination thereof.

TABLE 2

| | Example 1 (Manufacturing example 1) | Example 2 (Manufacturing example 2) | Example 3 (Manufacturing example 3) | Example 4 (Manufacturing example 4) | Example 5 (Manufacturing example 5) | Comparative example 1 (Manufacturing Comparative Example 1) | Comparative example 2 (Manufacturing Comparative Example 2) | Comparative example 3 (Manufacturing Comparative Example 3) | Comparative example 4 (Manufacturing Comparative Example 4) |
|---|---|---|---|---|---|---|---|---|---|
| Bending strength (N) | 241 | 256 | 246 | 264 | 261 | 120 | 135 | 87 | 190 |
| Lifetime (%) | 93 | 91 | 91 | 90 | 91 | 75 | 78 | 45 | 69 |
| Transfer rate of positive electrode active material after charging-discharging | 52 | 49 | 49 | 49 | 49 | 2 | 5 | 2 | 3 |
| Substrate binding force | 0.93 | 0.81 | 0.81 | 0.81 | 0.81 | 0.1 | 0.3 | 0.08 | 0.3 |

Referring to Table 2, the lithium batteries according to Manufacturing Examples 1 to have significantly improved lifetime characteristics than the lithium batteries according to Comparative Examples 1 to 4. The lithium battery according to Comparative Example 2 demonstrated excellent heat exposure characteristics, but as shown in Table 1, an adhesion ratio was less than 0.05, resulting in poor assembly processability and reduced lifetime characteristics of the cell. The separator according to Comparative Example 1, as shown in Table 2, had excellent assembly processability and reduced heat exposure characteristics, and the separator according to Comparative Example 3 exhibited reduced assembly processability and heat exposure characteristics.

Hitherto, an embodiment has been described with reference to the figures and Examples, and it is understood that the present disclosure should not be limited to these embodiments, but various changes, modifications, and other equivalent embodiments can be made by one ordinary skilled in the art. Therefore, the scope of protection of the present disclosure should be defined by the following claims.

While an embodiment has been described with reference to the figures, it will be understood by those of ordinary skill in the art that various changes and modifications in form and details may be made therein without departing from the spirit and scope as defined by the following claims.

2. The separator for a secondary battery of claim 1, wherein an amount of the nitrogen-containing compound is 1 part by weight to 5 parts by weight with respect to 100 parts by weight of the adhesive layer.

3. The separator for a secondary battery of claim 1, wherein the fluorine resin includes polyvinylidene fluoride, polyvinylidene fluoride-hexafluoropropylene copolymer, polyvinylidene fluoride-trichloroethylene copolymer, polyvinylidene fluoride-chlorotrifluoroethylene copolymer, or a combination thereof.

4. The separator for a secondary battery of claim 1, wherein the polyacrylic acid compound includes polyacrylic acid, polymethylacrylic acid, polyethylacrylic acid, polybutylacrylic acid, polyhexylacrylic acid, polyhydroxyethyl methacrylic acid, polyaminoacrylic acid, or a combination thereof.

5. The separator for a secondary battery of claim 1, wherein the adhesive layer further includes a (meth)acrylic binder.

6. The separator for a secondary battery of claim 5, wherein the (meth)acrylic binder includes polyacrylate, polymethacrylate, polybutylacrylate, polyacrylonitrile, or a combination thereof.

7. The separator for a secondary battery of claim 5, wherein a mixed weight ratio of the nitrogen-containing compound and the (meth)acrylic binder is 0.01:1 to 1:1.

8. The separator for a secondary battery of claim 1, wherein:

the inorganic layer includes inorganic particles and a crosslinkable binder, and the inorganic particles include $Al_2O_3$, $SiO_2$, $B_2O_3$, $Ga_2O_3$, $TiO_2$, $SnO_2$, Boehmite, $BaSO_4$, MgO, $Mg(OH)_2$, clay, ZnO, CaO, $CeO_2$, NiO, GaO, $ZrO_2$, $Y_2O_3$, $SrTiO_3$, $BaTiO_3$, or a combination thereof.

9. The separator for a secondary battery of claim 8, wherein the crosslinkable binder is a monomer, oligomer, or polymer having at least one functional group, the functional group including an acrylate group, a vinyl group, a hydroxyl group, an epoxy group, an oxane group, an oxetane group, an ester group, or an isocyanate group.

10. The separator for a secondary battery of claim 8, wherein:

the inorganic layer further includes a non-crosslinkable binder, and the non-crosslinkable binder is a single material including a polyvinylidene fluoride (PVdF) polymer, polymethyl methacrylate, polyacrylonitrile, polyvinylpyrrolidone, polyvinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methylcellulose, an acrylonitrile-butadiene-styrene copolymer, or a mixture thereof.

11. The separator for a secondary battery of claim 8, wherein an amount of the inorganic particles is 50 parts by weight to 95 parts by weight with respect to 100 parts by weight of the inorganic layer.

12. The separator for a secondary battery of claim 1, wherein an amount of the fluorine resin is 92 parts by weight to 96 parts by weight with respect to 100 parts by weight of the adhesive layer.

13. The separator for a secondary battery of claim 1, wherein an amount of the polyacrylic acid compound is 1 part by weight to 3 parts by weight with respect to 100 parts by weight of the adhesive layer.

14. The separator for a secondary battery of claim 1, wherein the fluorine resin has an average particle diameter of 100 nm to 300 nm.

15. A secondary battery, comprising:

a positive electrode, a negative electrode, and, the separator according to claim 1 between the positive electrode and the negative electrode.

16. The secondary battery of claim 15, wherein a transfer rate of a positive electrode active material to the separator after charging and discharging is 30% or more.

* * * * *